United States Patent
Amarendra et al.

(10) Patent No.: US 9,195,420 B2
(45) Date of Patent: Nov. 24, 2015

(54) SECURE PRINT JOB THROUGH MOBILE DEVICE ID

(71) Applicant: HEWLETT-PACKARD DEVELOPMENT COMPANY, L.P., Houston, TX (US)

(72) Inventors: Shakti Amarendra, Bangaloare (IN); Sankar Gomathi, Bangaloare (IN); Parthasarathy Niraj, Bangalore (IN); Gangahanumaiah Raghavendra, Bangalore (IN); P Shivaraj, Bangalore (IN)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 44 days.

(21) Appl. No.: 13/855,199

(22) Filed: Apr. 2, 2013

(65) Prior Publication Data

US 2014/0293314 A1    Oct. 2, 2014

(51) Int. Cl.
*G06K 15/00* (2006.01)
*G06F 3/12* (2006.01)
*G06F 21/60* (2013.01)
*G06F 21/35* (2013.01)

(52) U.S. Cl.
CPC ............ *G06F 3/1238* (2013.01); *G06F 3/1222* (2013.01); *G06F 3/1292* (2013.01); *G06F 21/35* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 6,751,732 B2 | 6/2004 | Strobel et al. | |
| 7,526,555 B2 | 4/2009 | Shahindoust | |
| 7,576,883 B2 * | 8/2009 | Ragnet | G06Q 30/0283 358/1.13 |
| 8,189,225 B1 * | 5/2012 | Lo | G06F 3/122 358/1.15 |
| 8,285,210 B2 * | 10/2012 | Oshima | H04W 4/02 358/1.15 |
| 2006/0181730 A1 | 8/2006 | Moore | |
| 2006/0279761 A1 * | 12/2006 | Wang | G06F 21/608 358/1.14 |
| 2009/0064346 A1 | 3/2009 | Larsson et al. | |
| 2009/0103124 A1 * | 4/2009 | Kimura | G06F 3/1204 358/1.15 |
| 2011/0211219 A1 * | 9/2011 | Bradley | G06F 3/12 358/1.15 |
| 2012/0075664 A1 * | 3/2012 | Nichols | G06F 3/1204 358/1.15 |
| 2012/0262753 A1 * | 10/2012 | Viccari | H04N 1/00307 358/1.15 |
| 2013/0027741 A1 * | 1/2013 | Liu | G06F 3/1204 358/1.15 |
| 2013/0085968 A1 * | 4/2013 | Schultz | G06F 21/32 705/400 |
| 2013/0215467 A1 * | 8/2013 | Fein | G06F 3/1204 358/1.15 |
| 2014/0253943 A1 * | 9/2014 | Mandaknale | G06K 15/4095 358/1.14 |

OTHER PUBLICATIONS

Get Started Now—Personal Printing in Use; ThinPrint—Cortado's Printing Technology; http://www.thinprint.com/Products/Overview/PersonalPrinting/Getstarted.aspx.

(Continued)

*Primary Examiner* — Marcus T Riley
(74) *Attorney, Agent, or Firm* — Mahamedi Paradice LLP

(57) ABSTRACT

In an example implementation, a processor-readable medium stores code representing instructions that when executed by a processor cause the processor to request a mobile device ID (identification) from a mobile device, generate a secure key from the mobile device ID, attach the secure key to a print job to create a secure print job, and send the secure print job to a printer.

16 Claims, 5 Drawing Sheets

(56) References Cited

OTHER PUBLICATIONS

Get Started Now—Personal Printing in Use; ThinPrint—Cortado's Printing Technology; http://www.thinprint.com/Products/Overview/PersonalPrinting/Getstarted.aspx, Jan. 8, 2013.

Hewlett-Packard Development Company, L.P, "HP Universal Print Driver," Solution and Feature Guide, 2009, http://h20331.www2.hp.com/Hpsub/downloads/UPD5.

* cited by examiner

SECURE PRINT JOB THROUGH MOBILE DEVICE ID

BACKGROUND

As technology advances, printing remains a fundamental tool that provides many benefits, such as increased productivity in various business environments and improved user experiences with regard to different types of printable media, including photographs, news articles, magazines, text books, and so on. However, the ability to keep printed materials secure from unauthorized use is of significant importance in many organizations. For example, healthcare organizations manage important personal information about patients that is often put into printed form. Keeping such information secure from unauthorized use helps to protect patient privacy. Accordingly, printing systems often provide a secure print job feature that helps to ensure that unauthorized users cannot access secured print jobs.

BRIEF DESCRIPTION OF THE DRAWINGS

The present embodiments will now be described, by way of example, with reference to the accompanying drawings, in which.

DETAILED DESCRIPTION

Overview

Figure 1:
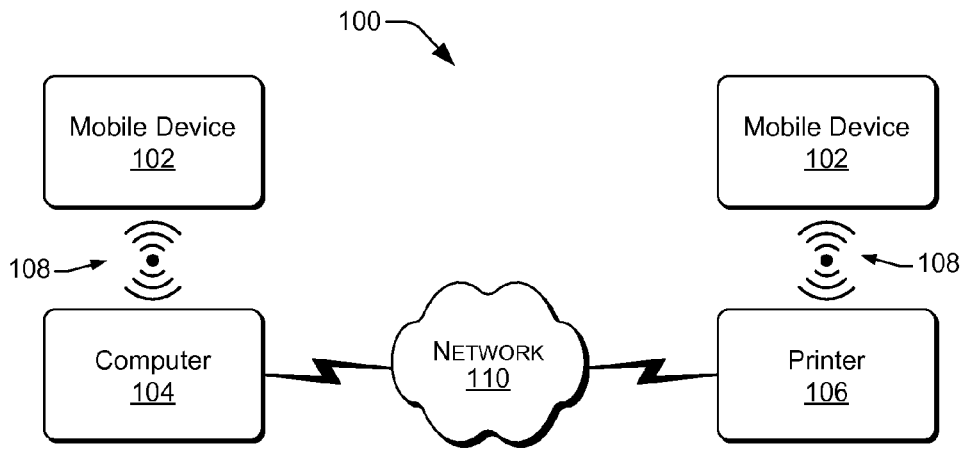
FIG. 1 shows an environment suitable for securing print jobs using a mobile device ID and a near-field-communication (NFC) secure key generation method, according to an example implementation.

As noted above, printing systems often provide a secure print job feature to help ensure that print jobs are not accessible by unauthorized users. Even in secure environments, such as within an office setting, printing certain types of sensitive documents not intended for unauthorized users can involve an amount of risk. For example, users often walk to a printer to collect a print out, only to find that their print out is missing. In many cases another user has simply collected the print out inadvertently. However, if the print out is a sensitive document, the user who printed the job is typically concerned about whether the print out will be returned, disposed of properly, placed in a public location such as a lost print box, and so on. In another scenario, users can also walk to a printer to collect a print out and find that they will have to wait for a previous large print job to complete before their print out will be printed. In such cases, a user printing a sensitive document is left with a choice of either canceling their print job or waiting by the printer to collect their sensitive document after the previous large print job has finished printing.

To help avoid these risks, some printers provide a security feature that allows the user to make print jobs private. One prior method of making a print job private involves the user inputting a PIN (personal identification number) that is associated with the submitted print job. The print job is stored with the PIN on the printer, and the user enters (i.e., keys in) the PIN again at the printer's control panel to process the job and receive the print out. Unfortunately, this method typically involves the user searching through a list of other stored print jobs at the printer's control panel to locate the correct job, and then providing the correct PIN to retrieve the job. If the user has multiple print jobs stored, printing the multiple jobs entails remembering multiple PINs. A user who forgets and/or misplaces a PIN can be faced with the permanent loss of a print job. Other disadvantages with this prior method of securing print jobs is that it enables a rogue user to try and acquire the PIN (e.g., by trial and error through brute-force attacks, or by heuristic methods) in order to attain the secured print job illegitimately.

Example methods and devices disclosed herein enable secured print jobs, generally through the use of unique mobile IDs, standard cryptographic techniques, and near field communication (NFC) or other short-range wireless communication technologies. A print driver feature on a computer offers a secure print job option that uses NFC technology or other wired or wireless technologies like Bluetooth or USB, to transfer a mobile device identification to the computer. A cryptographic algorithm uses the mobile device identification in a cryptographically random manner to generate a unique secure key that is attached to the print job. The secure print job (i.e., the print job with secure key attached) is sent to a printer and stored with other secure print jobs in a secure print job list. A user possessing the mobile device can then collect a print out of the secure print job. The user selects the secure print job from the list displayed on the printer control panel, and the print job is processed by the printer without additional user intervention. Before processing the job, however, the printer retrieves the mobile device's ID through an NFC reader, decrypts the secure key to establish the decrypted mobile device ID, and compares the retrieved mobile device ID with the decrypted mobile device ID. If the IDs match, the printer processes the print job.

Advantages of this method of securing print jobs include that there is no user involvement in transferring and matching the mobile device ID in order to process the print job. The user has no interaction with the mobile device ID either when the print job is being secured or when the print job is being processed. In addition, the user has no interaction with or access to the secure key generated from the ID. This removes the risk of a user forgetting or misplacing the ID and permanently losing the print job. It also significantly limits a rogue user's ability to gain unauthorized access to the print job output.

In an example implementation, a processor-readable medium stores code representing instructions that when executed by a processor cause the processor to request a mobile device ID (identification) from a mobile device, generate a secure key from the mobile device ID, attach the secure key to a print job to create a secure print job, and send the secure print job to a printer. In one implementation, the request is made over a short-range wireless, NFC communication.

In another example implementation, a processor-readable medium stores code representing instructions that when executed by a processor cause the processor to display a secure print job list, receive a user input selecting a secure print job from the list, determine a decrypted mobile device ID by decrypting a secure key attached to the secure print job, retrieve a mobile device ID from a mobile device, compare the decrypted mobile device ID with the retrieved mobile device ID, and print the secure print job when the decrypted mobile device ID and the retrieved mobile device ID match. In one implementation, the mobile device ID is retrieved over a short-range wireless, NFC communication.

In another example implementation, a processor-readable medium stores code representing instructions that when executed by a processor cause the processor to receive a request from a computer for a mobile device ID, select from multiple mobile device IDs, a mobile device ID that is a least recently selected mobile device ID, and reply to the request by sending the mobile device ID. In one implementation, the request and reply are made over a short-range wireless, NFC communication.

Illustrative Embodiments

FIG. 1 shows an environment 100 suitable for securing print jobs using a mobile device ID and a near-field-communication (NFC) secure key generation method, according to an example implementation. The environment 100 includes a user mobile device 102, a computer 104 such as a laptop or PC or any other computing device, and a printer 106. Mobile device 102 is intended to represent any of a variety of mobile (i.e., handheld) computing devices such as a smartphones, a tablet computer, a PDA, and the like. As noted below, such devices can be equipped with various technologies that enable short-range wireless communications links 108 to other similarly equipped devices. While two mobile devices 102 are shown in FIG. 1, it should be understood that these two devices represent the same mobile device 102 in two different instances of time.

Computer 104 is intended to represent any of a variety of conventional computing devices, such as a laptop, a desktop PC, a notebook or portable computer, a workstation, a mainframe computer, an Internet appliance, combinations thereof, and so on. Printer 106 is intended to represent any of a variety of conventional printing devices, such as a laser printer, an inkjet printer, a single or multi-function printer, a large or small format printer, and so on. Computer 104 and printer 106 are coupled through a network 110, and may be local or remote with respect to one another. Network 110 is intended to represent any of a variety of conventional network topologies and types (including optical, wired and/or wireless networks), employing any of a variety of conventional network protocols (including public and/or proprietary protocols). Network 110 may include, for example, a home network, a corporate network, cloud or the Internet, as well as one or more local area networks (LANs) and/or wide area networks (WANs) and combinations thereof. Network 110 may also include a cable or other suitable local communication link.

Figure 2:
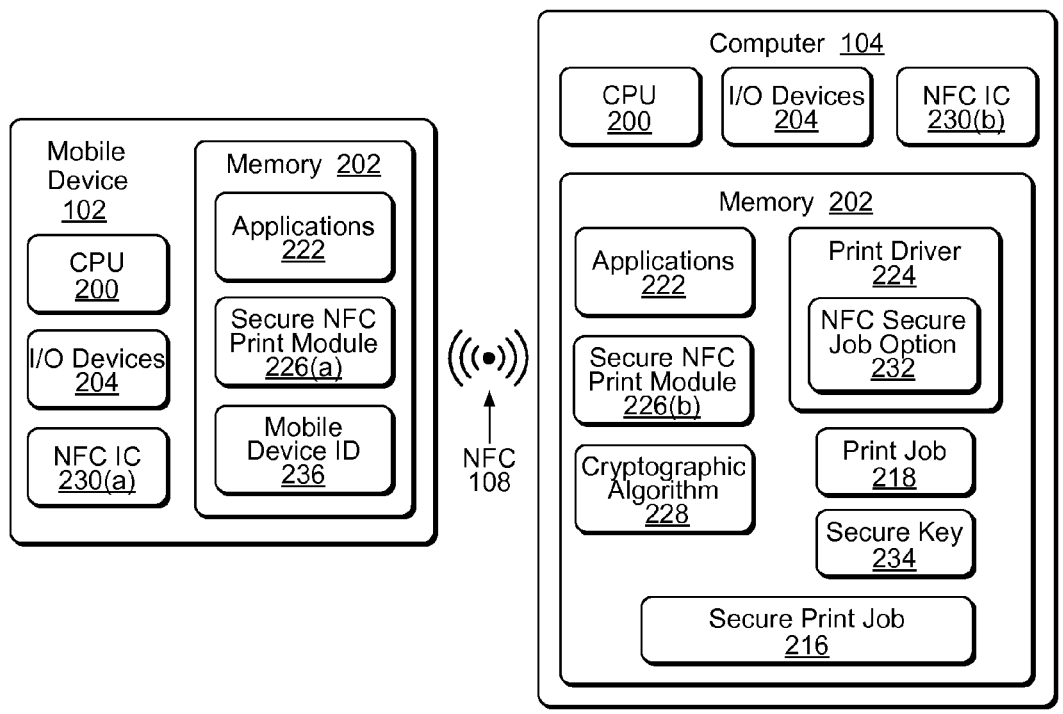
FIG. 2 shows components of a mobile device and a computer in block diagram form within a portion of the environment of FIG. 1, in which the mobile device and computer are in communication with one another via a short-range wireless communication link, according to an example implementation.
Figure 3:
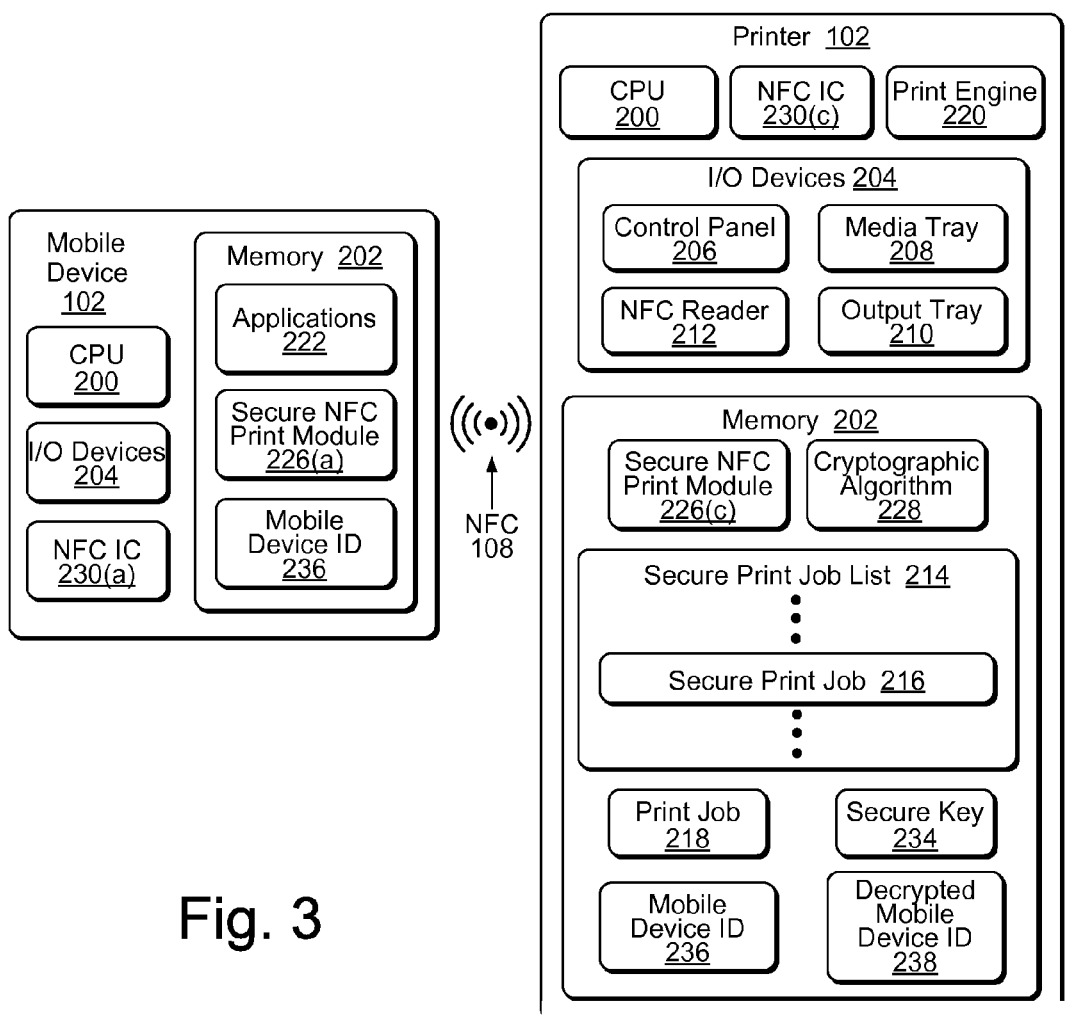
FIG. 3 shows components of the mobile device and a printer in block diagram form within a portion of the environment of FIG. 1, in which the mobile device and printer are in communication with one another via a short-range wireless communication link, according to an example implementation.

FIG. 2 shows components of a mobile device 102 and a computer 104 in block diagram form within a portion of the environment 100 in which the mobile device 102 and computer 104 are in communication with one another via a short-range wireless communication link 108, according to one aspect of an example implementation. FIG. 3 shows components of the mobile device 102 and a printer 106 in block diagram form within a portion of the environment 100 in which the mobile device 102 and printer 106 are in communication with one another via a short-range wireless communication link 108, according to another aspect of an example implementation.

Referring generally to FIGS. 2 and 3, the mobile device 102, computer 104, and printer 106, each incorporate components of a typical computing device, such as one or more processors (CPU) 200, and a memory 202. A memory 202 typically includes both volatile (i.e., RAM) and nonvolatile (e.g., ROM, hard disk, floppy disk, CD-ROM, etc.) memory components. The memory components of memory 202 comprise non-transitory computer/processor-readable media that provide storage of computer/processor-executable coded instructions, such as program modules, applications, algorithms, data structures, and other data.

The mobile device 102, computer 104, and printer 106, also include various input/output (I/O) devices 204. For example, I/O devices 204 on mobile device 102 usually include a key pad and/or a touch-sensitive display that implements a key pad, a speaker, a microphone, a camera, and so on. Computer 104 may include similar I/O devices 204, but also typically includes a keyboard, mouse, and display monitor. Printer 106 may include one or more similar I/O devices 204, but also comprises some additional I/O devices including a control panel 206, a media input tray 208, a media output tray 210, and an NFC reader 212. The printer control panel 206 may comprise, for example, a touch-sensitive display screen that enables users to view a secure print job list 214 and to select one or more secure print jobs 216 for processing. An NFC reader 212 may comprise an area near the control panel 206 on which a user may place a mobile device 102 to enable an NFC communication link 108 between the mobile device 102 and printer 106. Printer 106 processes a print job 218 in part, by accessing media from media tray 208 and depositing printed output into output tray 210. Printed output is generated by the printer's print engine 220 which translates print job 218 commands into a printed image on the media.

Mobile device 102 and computer 104 may implement (i.e., by execution on a processor 200) various application programs 222, such as word processing applications, spreadsheet applications, image editing applications, web browsing applications, and so on. Such applications 222 may generate print data (e.g., documents, spreadsheets, images) that is printable by printer 106 upon conversion of the data by a print driver 224 into a suitably formatted print job 218. Thus, print driver 224 receives and processes requests to print data from various applications 222. Other applications or modules, such as the secure NFC print modules 226(a), 226(b), and 226(c) on mobile device 102, computer 104, and printer 106, respectively, operate in conjunction with a cryptographic algorithm 228 and an NFC IC (integrated circuit) 230, to facilitate the submission and processing of secure print jobs 216.

For example, on computer 104, print driver 224 provides an NFC secure job option 232 that a user can select when printing a document. When the NFC secure job option 232 is selected, print driver 224 requests a secure key 234 from the secure NFC print module 226(b). The secure NFC print module 226(b) initiates an NFC communication 108 through the NFC IC 230(b), and requests a mobile device ID 236 from mobile device 102. The NFC IC 230 generally comprises different hardware and software components that implement a set of standards to establish radio communication between devices by touching them together or bringing them into close proximity. Thus, NFC ICs 230 enable short-range wireless communications between mobile device 102 and computer 104, as shown in FIG. 2, and between mobile device 102 and printer 106, as shown in FIG. 3. While NFC is the short-range wireless communication technology presented in the example implementations presented herein, other short-range wireless communication technologies or wired technologies like USB, etc., may also be suitable for use in a similar manner. Other short-range wireless communication technologies that may be suitable include radio frequency identification (RFID), Bluetooth, Gigabit Wireless (WiGig), Wireless USB, ZigBee and so on.

A mobile device ID 236 can include any of various credentials available from the mobile device 102, including an NFC ID, a MAC (media access control) ID, an IMEI (International Mobile Equipment Identity) ID, an IMS (International Mobile Subscriber) ID, and so on. The secure NFC print modules 226(*a*) and 226(*b*) determine which mobile device ID 236 to use based on which IDs have recently been used for previous print jobs. That is, if a mobile device ID 236 (e.g., NFC ID) has recently been provided for a prior secure print job request, a different mobile device ID 236 (e.g., MAC ID) that has been less recently used can be selected for the current request. The rotation of different mobile device IDs 236 based on their recency of use provides increased security to the secure print jobs 216. The secure NFC print modules 226(*a*) and 226(*b*) may implement various algorithms utilizing concepts like recency of mobile device ID used, random number generation to determine which mobile device ID to choose next, and such other algorithms which make the user uninvolved and indifferent to the key generation.

Once the mobile device ID 236 is determined, the secure NFC print module 226(*b*) on computer 104 executes the cryptographic algorithm 228 (e.g., based on standards like AES (Advanced Encryption Standard)) which uses the mobile device ID 236 as a seed to generate a secure key 234. The secure NFC print module 226(*b*) then provides the secure key 234 to the print driver 224. The print driver 224 attaches the key 234 to the print job 218 creating a secure print job 216, and sends the secure print job 216 to the printer 106 via network 110. The transfer of the secure print job 216 to the printer 106 via network 110 can be further secured through encryption standards like WPA2 and/or IEEE 802.1x.

The user retrieves the secure print job 216 from the printer 106 by activating the printer control panel 206 and selecting the secure print job 216 from a secure print job list 214 displayed on the control panel 206. When the user selects a secure print job 216, the secure NFC print module 226(*c*) on the printer 106 executes the cryptographic algorithm 228 to decrypt the secure key 234 attached to the secure print job 216, generating a decrypted mobile device ID 238. In addition, the secure NFC print module 226(*c*) prompts the user with a message on the control panel 206 to place the mobile device 102 on or near the NFC reader 212, if the user has not already done so, and initiates an NFC communication 108 through the NFC IC 230(*c*), requesting a mobile device ID 236 from mobile device 102. In response to the request, the secure NFC print module 226(*a*) on mobile device 102 provides the mobile device ID 236. The secure NFC print module 226(*c*) on printer 106 then compares the decrypted mobile device ID 238 with the mobile device ID 236. If the IDs match, the secure NFC print module 226(*c*) instructs the printer 106 to process the print job 218. If the decrypted mobile device ID 238 and the mobile device ID 236 do not match, the secure NFC print module 226(*c*) displays a message on the printer control panel 206 indicating an invalid mobile device ID.

In another implementation of the user retrieving the secure print job 216 from the printer 106, the secure NFC print module 226(*c*) on the printer 106 decrypts the secure key 234 attached to the secure print job 216, using the mobile device ID 236 as the seed for decryption algorithm 228. The secure NFC print module 226(*c*) on printer 106 then compares the decrypted mobile device ID 238 with the mobile device ID 236. If the IDs match, the secure NFC print module 226(*c*) instructs the printer 106 to process the print job 218. If the decrypted mobile device ID 238 and the mobile device ID 236 do not match, the secure NFC print module 226(*c*) displays a message on the printer control panel 206 indicating an invalid mobile device ID.

In another example implementation, the secure NFC print module 226(*c*) requests multiple mobile device IDs 236 that are available on the mobile device 102 (e.g., NFC ID, MAC ID, IMEI ID, IMS ID), and compares the decrypted mobile device ID 238 with each of the multiple mobile device IDs 236. If any one of the multiple mobile device IDs match the decrypted mobile device ID, the secure NFC print module 226(*c*) instructs the printer 106 to process the print job 218. If none of the multiple mobile device IDs match the decrypted mobile device ID, the secure NFC print module 226(*c*) displays a message on the printer control panel 206 indicating an invalid mobile device ID.

Figure 4:
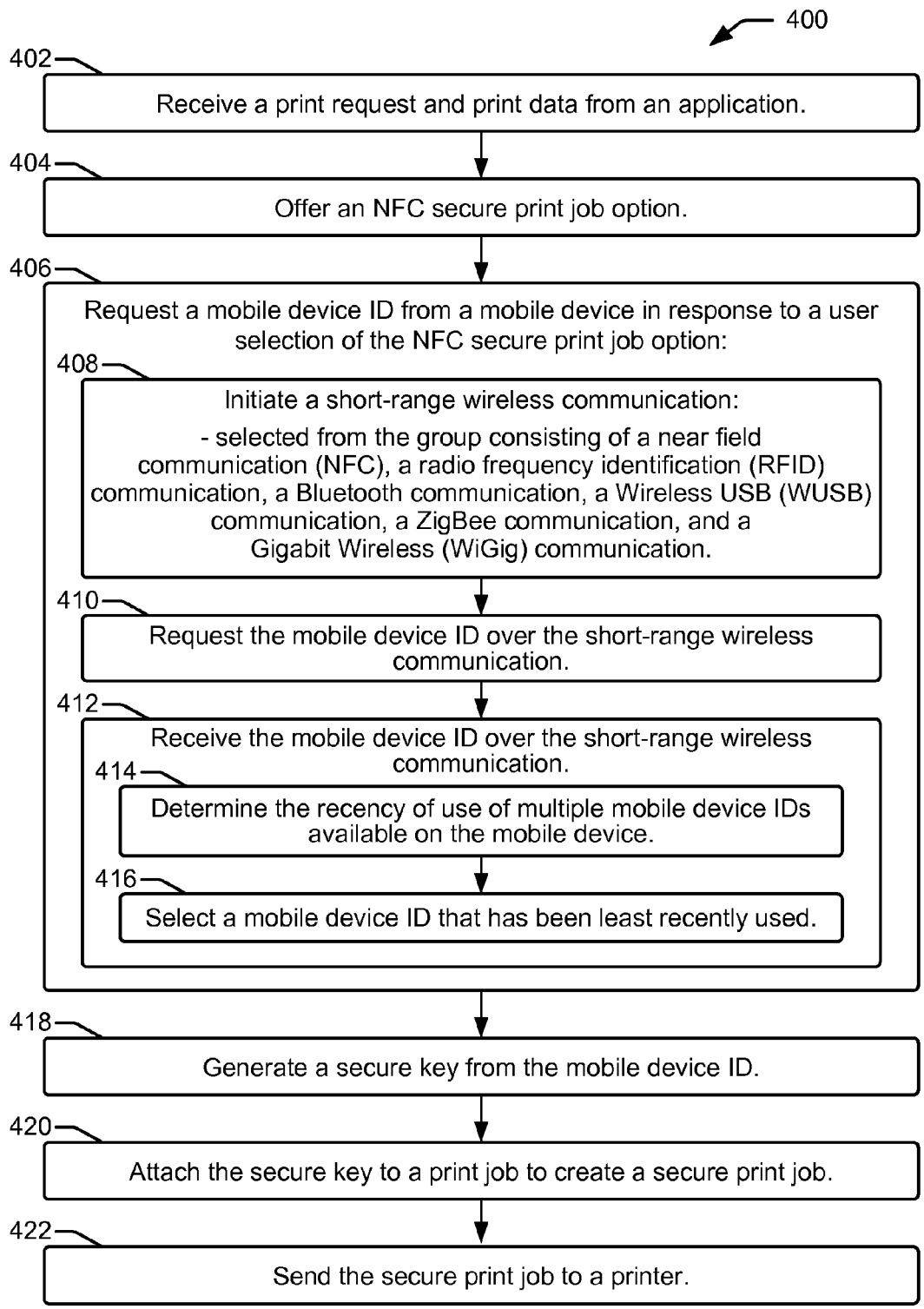
FIGS. 4-6, show flowcharts of example methods related to securing a print job using a mobile device ID and near-field-communication (NFC) secure key generation, according to example implementations.
Figure 5:
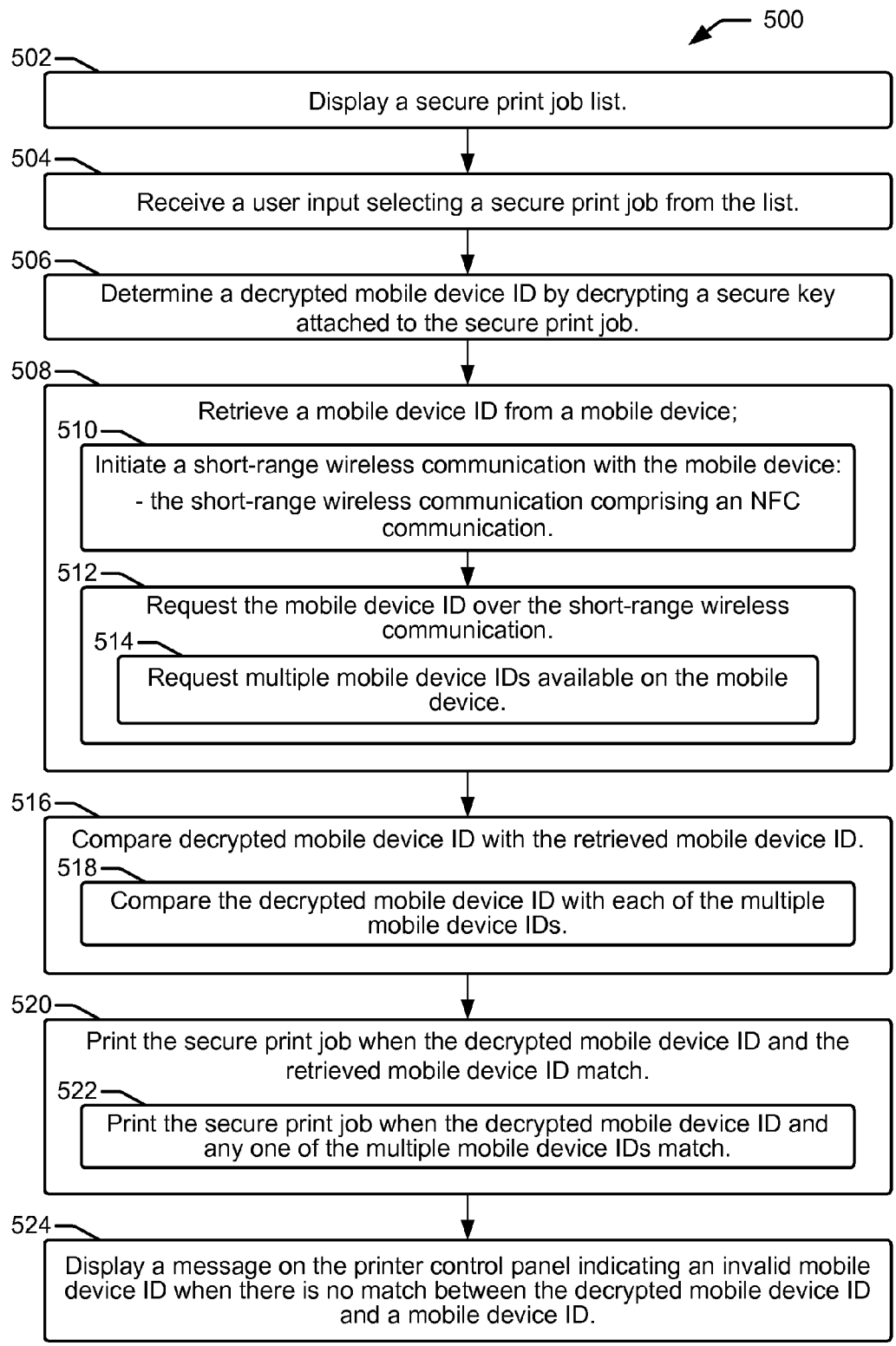
Figure 6:
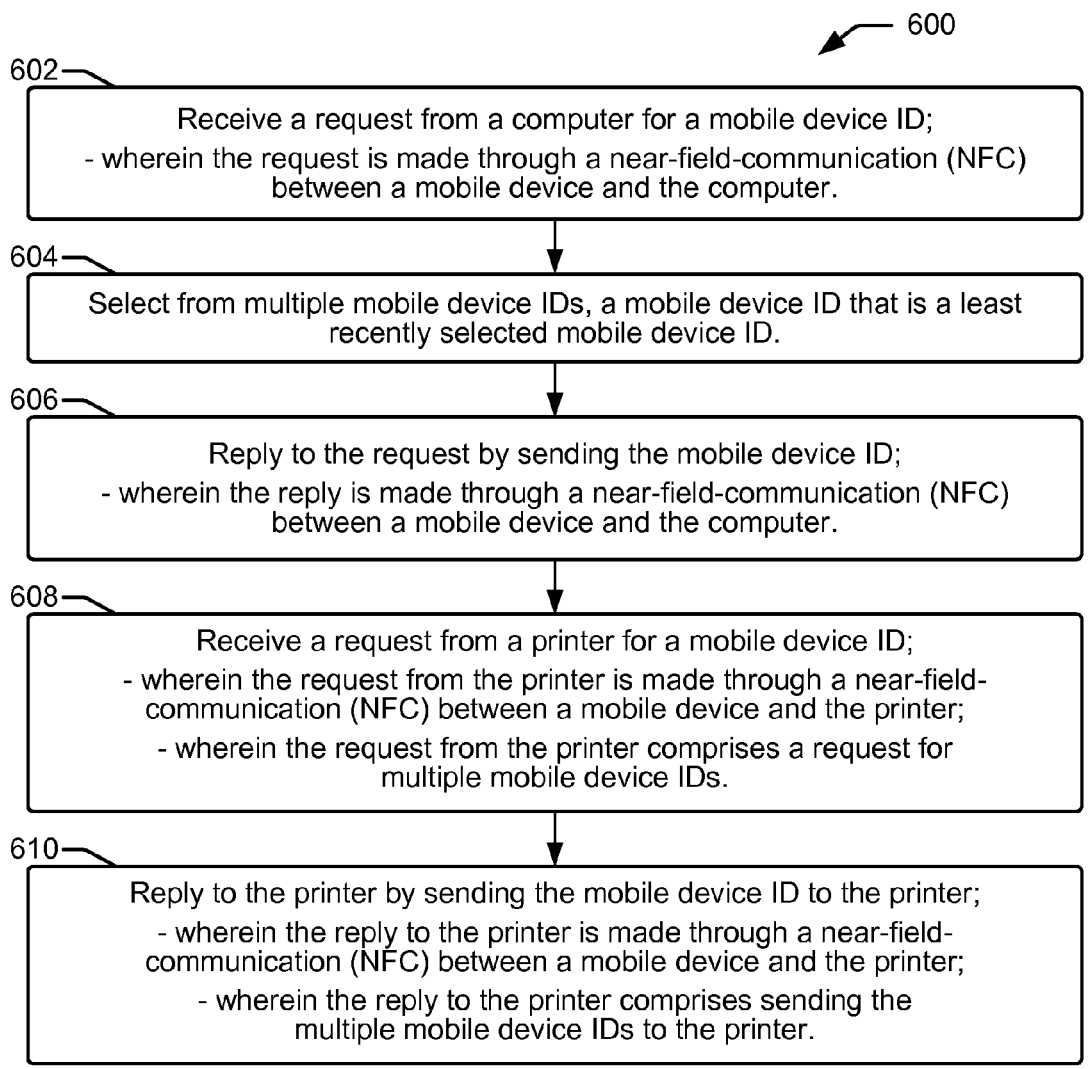

FIGS. 4-6, show flowcharts of example methods 400, 500, and 600, related to securing a print job using a mobile device ID and near-field-communication (NFC) secure key generation, according to example implementations. Methods 400, 500, and 600, are associated with the example implementations discussed above with regard to FIGS. 1-3, and details of the steps shown in methods 400, 500, and 600, can be found in the related discussion of such implementations. The steps of methods 400, 500, and 600, may be embodied as programming instructions stored on a non-transitory computer/processor-readable medium, such as memory 202 of FIGS. 1-3. In one example, the implementation of the steps of methods 400, 500, and 600, is achieved by the reading and execution of such programming instructions by a processor, such as processor 200 of FIGS. 1-3. Methods 400, 500, and 600, may include more than one implementation, and different implementations of methods 400, 500, and 600, may not employ every step presented in the respective flowcharts. Therefore, while steps of methods 400, 500, and 600, are presented in a particular order within their respective flowcharts, the order of their presentation is not intended to be a limitation as to the order in which the steps may actually be implemented, or as to whether all of the steps may be implemented. For example, one implementation of method 600 might be achieved through the performance of a number of initial steps, without performing one or more subsequent steps, while another implementation of method 600 might be achieved through the performance of all of the steps.

Referring to FIG. 4, method 400 begins at block 402, with receiving a print request and print data from an application, such as an application 222 running on a computer 104. At block 404, the method continues with offering an NFC secure print job option, such as printer driver 224 providing an NFC secure print job option in response to the print request. A request for a mobile device ID from a mobile device is then made in response to a user selection of the NFC secure print job option, as shown at block 406. As shown at block 408, the request for a mobile device ID can include initiating a short-range wireless communication, where the short-range wireless communication is selected from the group consisting of a near field communication (NFC), a radio frequency identification (RFID) communication, a Bluetooth communication, a Wireless USB (WUSB) communication, a ZigBee communication and a Gigabit Wireless (WiGig) communication. The request can then be made over the short-range wireless communication as shown at block 410. The mobile device ID is then received over the short-range wireless communication as shown at block 412. As shown at blocks 414 and 416, respectively, receiving the mobile device ID can include determining the recency of use of multiple mobile device IDs available on the mobile device, and selecting a mobile device ID that has been the least recently used. At block 418, a secure key is generated from the mobile device ID. The secure key is then attached to a print job to create a secure print job, and the secure print job is sent to a printer, as shown in blocks 420 and 422, respectively.

Referring to FIG. 5, method 500 begins at block 502, with displaying a secure print job list. For example, a user wanting to collect a secure print job can activate a printer control panel and the control panel will display a list of secure print jobs. At block 504, the method 500 continues with receiving a user input that selects a secure print job from the list. A decrypted mobile device ID is determined by decrypting a secure key that is attached to the secure print job, as shown at block 506. Generally concurrent with decrypting a secure key, a mobile device ID is retrieved from a mobile device, which may itself be used as a seed for the decryption algorithm, as shown at block 508. As shown at block 510, retrieving the mobile device ID includes initiating a short-range wireless communication with the mobile device, where the short-range wireless communication comprises an NFC communication. The request for the mobile device ID then happens over the short-range wireless communication, as shown at block 512. In some implementations, the request can be a request for multiple mobile device IDs available on the mobile device, as shown at block 514. At block 516, the decrypted mobile device ID is compared with the retrieved mobile device ID. When multiple mobile device IDs are retrieved, the decrypted mobile device ID is compared with each of the multiple mobile device IDs, as shown at block 518. The secure print job is printed when the decrypted mobile device ID and the retrieved mobile device ID match, as shown at block 520. When the decrypted mobile device ID is compared with each of the multiple mobile device IDs, the secure print job is printed when the decrypted mobile device ID matches any one of the multiple mobile device IDs, as shown at block 522. If there is no match between the decrypted mobile device ID and any mobile device ID, a message is displayed on the printer control panel indicating an invalid mobile device ID.

Referring to FIG. 6, method 600 begins at block 602, with receiving a request from a computer for a mobile device ID. The request is made through a near-field-communication (NFC) between a mobile device and the computer. At block 604, a mobile device ID that is a least recently selected mobile device ID is then selected from among multiple mobile device IDs. A reply to the request includes sending the selected mobile device ID, as shown at block 606. The reply is made through a near-field-communication (NFC) between a mobile device and the computer. At block 608, a request is received from a printer for a mobile device ID. The request from the printer is made through a near-field-communication (NFC) between a mobile device and the printer. In some implementations, the request from the printer comprises a request for multiple mobile device IDs. At block 610, a reply is made to the printer by sending the mobile device ID to the printer. The reply to the printer is made through a near-field-communication (NFC) between a mobile device and the printer. In some implementations the reply to the printer comprises sending the multiple mobile device IDs to the printer.

What is claimed is:

1. A non-transitory processor-readable medium storing instructions that, when executed by a processor of a computing device, cause the computing device to:
receive a print input from a user on the computing device to execute a print job;
receive a user selection of a secure print job option on the computing device;
in response to receiving the user selection, request a mobile device ID from a mobile device of the user;
receive the mobile device ID from the mobile device;
generate a secure key based on the mobile device ID;
attach the secure key to the print job to create a secure print job; and
send the secure print job to a near-field communication (NFC) enabled printer.

2. The non-transitory processor-readable medium of claim 1, wherein the instructions, when executed by the processor, further cause the computing device to:
in response to receiving the print input, display the secure print job option on a display screen of the computing device.

3. The non-transitory processor-readable medium of claim 1, wherein requesting the mobile device ID comprises:
initiating a short-range wireless communication link with the mobile device;
requesting the mobile device ID over the short-range wireless communication link; and
receiving the mobile device ID over the short-range wireless communication link.

4. The non-transitory processor-readable medium of claim 1, wherein receiving the mobile device ID further comprises:
determining a recency of use for multiple mobile device IDs available on the mobile device; and
selecting the mobile device ID based on the mobile device ID being least recently selected.

5. The non-transitory processor-readable medium of claim 3, wherein the computing device uses the mobile device ID as a seed to generate the secure key using a cryptographic algorithm.

6. The non-transitory processor-readable medium of claim 3, wherein the short-range wireless communication link comprises one of a NFC link, a radio frequency identification (RFID) link, a Bluetooth link, a Wireless USB (WUSB) link, a ZigBee_link, and a Gigabit Wireless (WiGig) link.

7. A non-transitory processor-readable medium storing instructions that, when executed by a processor of a printer, cause the printer to:
display a secure print job list on a printer control panel;
receive a user input via the printer control panel, from a user of a mobile device, selecting a secure print job from the secure print job list;
generate a decrypted mobile device ID by decrypting a secure key attached to the selected secure print job;
receive, over a near-field communication (NFC) interface of the printer, a mobile device ID from the mobile device;
compare the decrypted mobile device ID with the received mobile device ID; and
print the secure print job when the decrypted mobile device ID and the retrieved mobile device ID match.

8. The non-transitory processor-readable medium of claim 7, wherein the executed instructions cause the printer to (i) initiate the NFC interface in response to receiving the user input, and (ii) request the mobile device ID using the NFC interface.

9. The non-transitory processor-readable medium of claim 7, wherein decrypting the secure key comprises executing a cryptographic algorithm to generate the decrypted mobile device ID.

10. The non-transitory processor-readable medium of claim 8, wherein requesting the mobile device ID comprises requesting multiple mobile device IDs available on the mobile device, and wherein the instructions, when executed by the processor further cause the printer to:

compare the decrypted mobile device ID with each of the multiple mobile device IDs; and print the secure print job when the decrypted mobile device ID and any one of the multiple mobile device IDs match.

11. The non-transitory processor-readable medium of claim 10, wherein the instructions, when executed by the processor, further cause the printer to:

display a message on a printer control panel indicating an invalid mobile device ID when there is no match between the decrypted mobile device ID and a mobile device ID.

12. A printer comprising:

a printer control panel;

a processor; and a memory storing instructions that, when executed by the processor, cause the printer to:

display a secure print job list on the printer control panel;

receive a user input via the printer control panel, from a user of a mobile device, selecting a secure print job from the secure print job list;

determine a decrypted mobile device ID by decrypting a secure key attached to the selected secure print job;

receive, over a near-field communication (NFC) interface of the printer, a mobile device ID from the mobile device;

compare the decrypted mobile device ID with the received mobile device ID; and print the secure print job when the decrypted mobile device ID and the retrieved mobile device ID match.

13. The printer of claim 12, wherein the executed instructions cause the printer to (i) initiate the NFC interface in response to receiving the user input, and (ii) request the mobile device ID using the NFC interface.

14. The printer of claim 12, wherein decrypting the secure key comprises executing a cryptographic algorithm to generate the decrypted mobile device ID.

15. The printer of claim 13, wherein requesting the mobile device ID comprises requesting multiple mobile device IDs available on the mobile device, and wherein the instructions, when executed by the processor further cause the printer to:

compare the decrypted mobile device ID with each of the multiple mobile device IDs; and print the secure print job when the decrypted mobile device ID and any one of the multiple mobile device IDs match.

16. The printer of claim 15, wherein the instructions, when executed by the processor, further cause the printer to:

display a message on the printer control panel indicating an invalid mobile device ID when there is no match between the decrypted mobile device ID and a mobile device ID.

* * * * *

UNITED STATES PATENT AND TRADEMARK OFFICE
CERTIFICATE OF CORRECTION

PATENT NO. : 9,195,420 B2
APPLICATION NO. : 13/855199
DATED : November 24, 2015
INVENTOR(S) : Shakti Amarendra et al.

It is certified that error appears in the above-identified patent and that said Letters Patent is hereby corrected as shown below:

In the claims,

In column 8, line 7, in Claim 1, delete "near-field communication" and insert -- near-field-communication --, therefor.

In column 8, line 47, in Claim 7, delete "near-field communication" and insert -- near-field-communication --, therefor.

In column 9, line 24, in Claim 12, delete "near-field communication" and insert -- near-field-communication --, therefor.

Signed and Sealed this
Twenty-first Day of June, 2016

Michelle K. Lee
*Director of the United States Patent and Trademark Office*